No. 896,612. PATENTED AUG. 18, 1908.
O. P. BECK.
APPARATUS FOR MAKING HALF STUFF FROM PEAT TURF.
APPLICATION FILED AUG. 17, 1906.

2 SHEETS—SHEET 1.

Witnesses
Adolph F. Dinse
Charles D. King.

Inventor
Oscar Peter Beck
By his Attorneys Dunn & Fuck

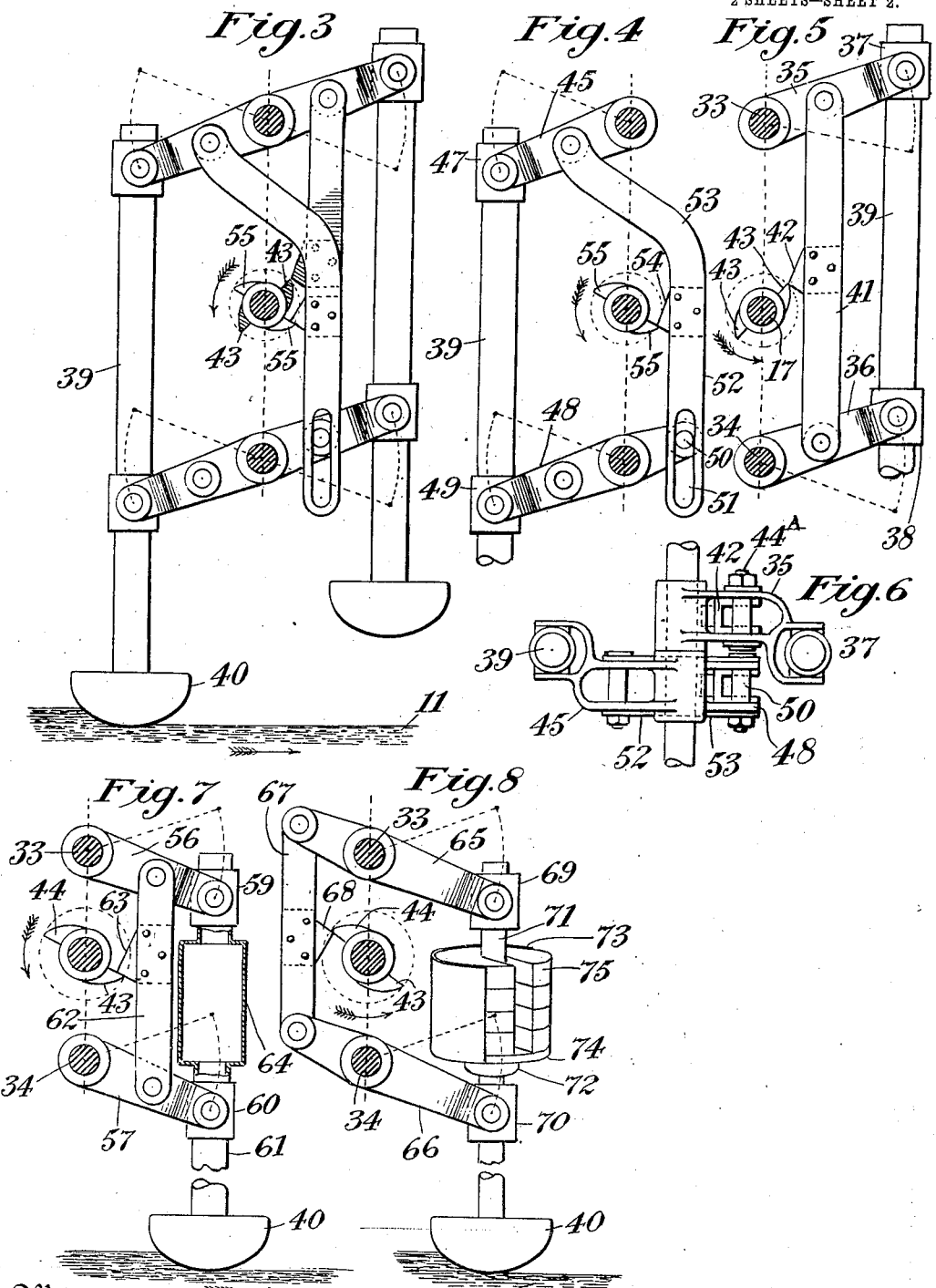

UNITED STATES PATENT OFFICE.

OSCAR PETER BECK, OF NEW YORK, N. Y., ASSIGNOR, BY MESNE ASSIGNMENTS, TO EDWARD P. METCALF, OF PROVIDENCE, RHODE ISLAND, AND ADOLPH LOEWENTHAL AND CLIFFORD E. DUNN, OF NEW YORK, N. Y., TRUSTEES.

APPARATUS FOR MAKING HALF-STUFF FROM PEAT-TURF.

No. 896,612.      Specification of Letters Patent.      Patented Aug. 18, 1908.

Application filed August 17, 1906. Serial No. 331,018.

*To all whom it may concern:*

Be it known that I, OSCAR PETER BECK, a subject of the Emperor of Germany, at present residing in the city of New York, county and State of New York, United States of America, have invented certain new and useful Improvements in Apparatus for Making Half-Stuff from Peat-Turf, of which the following is a full, clear, and exact specification.

My invention relates to machines for the reduction of peat turf, whereby the said peat is prepared as a paper or paper-board stock, and particularly to that type of machine wherein the raw peat turf is spread upon a carrier and there subjected to the action of stampers, so as to reduce the whole to a fibrous mass without removing the vegetable matter, and my invention consists in various improvements in the details of construction of such machine hereinafter more particularly pointed out, whereby the construction of said machine is simplified, less power is consumed in the machine, and its operation is improved.

My invention also relates to an improved form of stamper used in connection with the said machine, whereby the more effectual reduction of the peat turf is accomplished.

My improved machine is fully illustrated in the accompanying drawings, wherein

Figure 1:
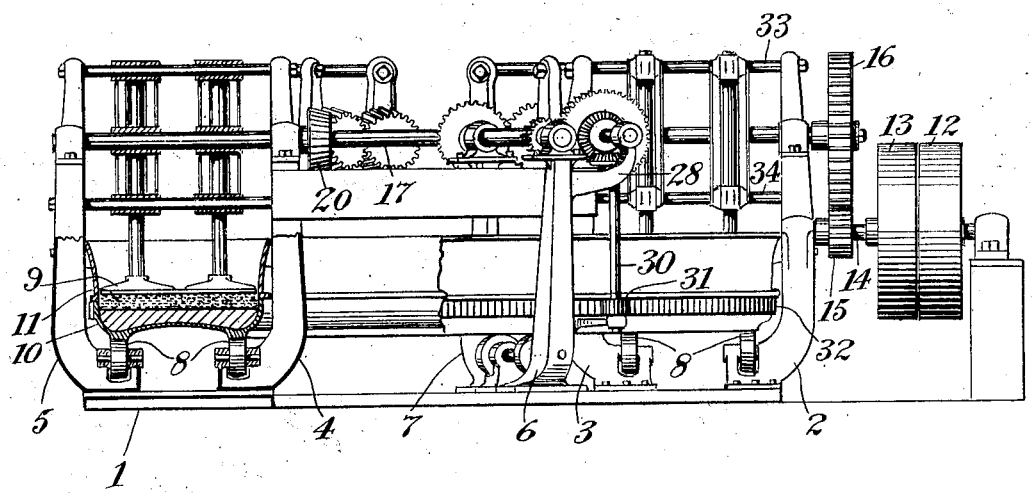
Figure 2:
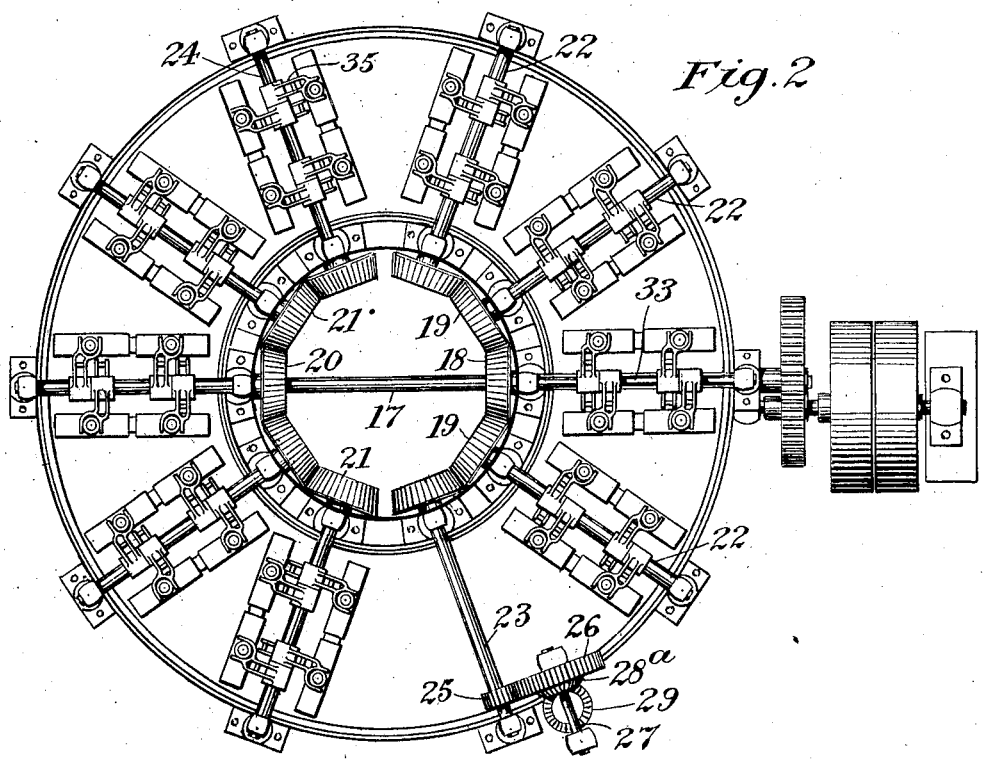

Figure 1 is an elevation of said machine with part thereof broken away for clearness. Fig. 2 is a horizontal plan view of the machine. Fig. 3 is a vertical sectional elevation of the stamper actuating mechanism. Figs. 4 and 5 are similar views showing details of the same mechanism. Fig. 6 is a detail plan view of the mechanism illustrated in Fig. 3, the stampers being omitted; and Figs. 7 and 8 are sectional elevations in detail of a modified form of the stamper actuating devices.

My improved machine is mounted upon a base 1, to which are attached upwardly extending posts or standards 2, 3, 4, 5, 6, 7. Upon the upper part of the inwardly extending bases of these posts are suitably journaled a series of rollers 8, upon which revolves the annular peat carrier 9, the sides of which extend upwardly, forming walls. Upon the inner side of the bottom of this carrier is a bed plate 10, which may be made of stone, iron, or other suitable rigid material, and which carries the evenly spread bed of peat turf 11, which is to be treated.

The power to operate the machine is obtained through fast and loose pulleys 12, 13, mounted upon driving shaft 14, which is connected by pinion 15, with gear 16, fixed upon the driving shaft 17, which is journaled in posts 2, 3, 4, 5. Fixed upon the same shaft 17, is a beveled gear 18, in mesh with a series of similar gears 19, and also fixed upon the said shaft 17 is another similar beveled gear 20, in mesh with another series of similar gears 21. Gears 19 are mounted upon radial operating shafts 22, and upon carrier driving shaft 23, and gears 21 are mounted upon radial operating shafts 24. Each of these operating shafts 22 and 24 are journaled in posts similar to posts 4 and 5, which are attached to the base plate 1, and project upwardly from it. Shaft 23 is journaled in posts 6 and 7, and has near its outer end a pinion 25, meshing with gear 26, mounted upon shaft 27, journaled in arms 28, projecting from the post 6. Fixed upon shaft 27 is a beveled gear 28$^a$, meshing with beveled gear 29, upon shaft 30, which at its lower end carries pinion 31, meshing with a rack 32, upon the exterior lower surface of the carrier 9, by which the said carrier is rotated.

As illustrated, the machine contains nine sets of stampers, each set comprising four stampers, and situated, two upon each side of the operating shafts. The shaft 17 operates one set of stampers at each end, and the other sets of stampers are operated by countershafts 22 and 24.

Mounted in each pair of posts 2, 3, are two supporting rods or shafts 33, 34, arranged vertically above and below shaft 17, and carrying loosely journaled thereon rocking levers 35, 36, which at their outer ends are pivotally secured to collars 37, 38, which are fixed upon the stem 39 of the stamp 40. Rocking levers 35 and 36 are connected by connecting rod 41, to which, at about midway of its length, is attached a tappet 42, which is lifted by cams 43, of which two are illustrated, fixed upon opposite sides of shaft 17.

As shown in the plan view, Fig. 6, rock lever 35, is bifurcated at its outer end, where it embraces the stem 39, and likewise at its inner end, and connecting rod 41 is likewise made in two parts connected by the outwardly extending arms of tappet 42, and by headed bolt 44$^A$ and nut to the rock lever 35, and by a similar bolt to lever 36. From the opposite side of shaft 33 likewise project other rock levers 45, loosely journaled upon the said shafts. Rock lever 45 is similar to rock lever 35, and at its outer bifurcated end is pivotally attached to collar 47, fixed upon stem 39, which at its lower end carries the stamp 40. Shaft 34 carries a rock lever 48, which projects in the same direction as rock lever 45, and is pivotally connected to collar 49, fixed upon stem 39. This rock lever 48 likewise projects a short distance from the opposite side of shaft 34, and terminates in a stud or bolt 50, which passes through the bifurcated ends of said rocking lever 48, and the outer ends of which also enter a slot 51, in the lower end of a bifurcated connecting rod 52, the lower slotted ends of which embrace the bifurcated ends of said rock lever 48, and are held in place by a nut and head upon the bolt 50. The said connecting rod 52 above the operating shaft has a bend at 53, which causes it to pass to the opposite side of the operating shaft, where it is pivotally connected to rock lever 45 by bolt and nuts. Situated midway upon the connecting rod 52, is a tappet 54, in position to be engaged by cams or lugs 55, fixed upon opposite sides of the operating shaft, 17.

In the form illustrated in Figs. 3, 4, and 5, the stamps 40 are raised and then allowed to drop by their own weight. I have shown, however, in Figs. 7 and 8, a modified form in which adjustable weights are employed for the purpose of increasing the quickness of action of the stamper, and adding to the force of the blow.

In the form shown in Fig. 7, bifurcated rock levers 56, 57 are journaled upon shafts 33, 34, and their outer ends are pivotally secured to collars 59, 60, which are fixed upon the stem 61 of the stamp 40. The rock levers 56, 57, are connected by bifurcated connecting rod 62, which is pivotally secured to them as by bolts, and to which is attached tappet 63, operated by cams 43, 44, fixed upon the operating shaft.

Stem 61 is made hollow, and has a central chamber 64, in which may be placed the desired quantity of weighting material, as for instance, shot.

In the form illustrated in Fig. 8, the shafts 33, 34 carry rock levers 65, 66, which are bifurcated, and project from one side of the said shafts a short distance, terminating in pivots or bolts, by which the said levers are connected to connecting rod 67, to which is attached tappet 68, operated by cams 43, 44, which are fixed upon the operating shaft. The opposite ends of the levers 65, 66 are pivoted to collars 69, 70, which are fixed upon the stem 71 of the stamp 40. Said stem has fixed upon it a supporting collar 72, above which is a semi-cylindrical shell 73, which as shown is open at the top, and has a base 74, and is designed to receive weights 75. These weights have radial slots equal in width to the diameter of the stem 71, by which they may be inserted in the shell 73, and after insertion may be partly turned around and will be securely held in place. Any number of said weights may be employed, thus securing the desired weight upon the stamper 40.

Figs. 7 and 8 illustrate two forms of weighted stamper, each of which, as shown, is adapted to operate upon the same side of the shafts 33, 34. The opposite sets of stampers may be of the form illustrated in Fig. 4, and actuated by the devices there shown, the stamp stem 39, however, in such case being weighted as illustrated in either Fig. 7 or 8.

The form of stamper illustrated is regarded as highly desirable, and the same forms part of my present invention. The said stamper may be rectangular in area, or of other desired shape. The lower surface, however, which contacts with the peat, I make in a curved or semi-circular form, whereby the same has the highly advantageous property of easily penetrating the mass of peat, and reduces or draws out the fibers in a satisfactory manner. The said stampers are shown in end view in Fig. 3, from which it will appear that the bearing surface thereof is curved in cross section, or in the direction of movement of the peat, and, as shown in Fig. 1, the said stampers are not curved longitudinally or in the direction transverse to the movement of said peat. I prefer to make the said stampers of wood, as this material has been found to be highly satisfactory for this purpose. Other material, however, may be employed.

The operation of my device is as follows: A layer of peat turf having been spread upon the bed plate 10, of the carrier 9, power will be applied to the said machine and the carrier rotated through the train of gearing connected with shaft 23. Simultaneously, beveled gears 19 and 21 will be set in motion through the gears 18, 20, upon operating shaft 17, and lugs 43 will, through tappet 42, raise their connected stamper 40, which will drop as soon as the said lug passes tappet 42. As soon as this occurs lug 55 will engage tappet 54, and the opposite set of arms will cause their connected stamper 40 to operate. By this means, through the employment of a single operating shaft, which rotates continuously in one direction, I cause oppositely disposed stampers to alternately stamp the peat turf. I have illustrated two stampers upon each side of each shaft. They will be constructed and operated in the same manner. More than two may be employed if desired, for this purpose.

It is obvious that modifications and changes in the form and connections of the various elements shown may be made without departing from the spirit of my invention, but

What I claim and desire to secure by Letters Patent is:

1. A machine for stamping peat turf, comprising a carrier, means for moving same, stampers arranged in operative relation to said carrier, and upon each side of the operating shaft, a single operating shaft, means for driving same, and connections between said stampers and said shaft whereby a continuous rotation of said shaft will alternately operate said oppositely disposed stampers, substantially as described.

2. A machine for stamping peat turf, comprising a movable carrier, means for moving same, a stamper arranged in operative relation to said carrier, rocking levers pivotally attached to said stamper, supports for said levers, a connecting rod pivotally attached to said levers, a tappet on said rod, an operating shaft, a cam thereon, and connections for rotating said shaft, substantially as described.

3. In a machine of the character described, an operating shaft, a stamper at one side thereof, a supporting shaft, a rocking lever mounted upon said supporting shaft and pivotally attached to said stamper, a rod pivotally connected to said lever at one side of the operating shaft, and bent so that its other end passes the opposite side of the operating shaft, means for holding said rod and said stamper in operative position, a tappet on said rod and a cam on said shaft, substantially as described.

4. A machine for stamping peat turf, comprising a rotating annular carrier having inner and outer walls, a bed plate, means for rotating said carrier, a series of sets of stampers located in operative position with relation to said carrier, a single operating shaft located between the stampers in each set, connections between said stampers and said shaft whereby a continuous rotation of the shaft will alternately reciprocate oppositely disposed stampers, substantially as described.

5. A machine for stamping peat turf, comprising a movable carrier, means for moving same, a pair of stampers arranged in operative relation to said carrier, a single operating shaft between said stampers, rocking levers pivotally attached to each of said stampers, supports for said levers, rods pivotally attached to each of said levers, both said rods having a portion on the same side of the operating shaft, means for holding said rods in operative position, tappets on said rods, an operating shaft and lugs thereon, adapted by the means described to cause alternating reciprocations of the stampers, substantially as described.

6. A machine for stamping peat turf, comprising a rotatable carrier, means for rotating same, stampers arranged in operative relation to said carrier, an operating shaft located between adjacent stampers, rocking levers pivotally connected to said stampers, supports for said levers, rods pivotally connected to said rocking levers, both said rods extending for a portion of their length on the same side of the operating shaft, means for maintaining said rods against lateral movement, tappets on said rods and lugs on said operating shaft, whereby the continuous rotation of said shaft will cause the alternate reciprocation of said stampers, substantially as described.

7. A machine for stamping peat turf, comprising a rotating annular carrier, means for rotating same, a bed plate of rigid material therein, a series of sets of stampers arranged in operative relation thereto, a single operating shaft located between the stampers in each set, means for operating same, supporting shafts above and below each operating shaft, rocking levers upon said supporting shafts pivotally connected to each stamper, connecting rods between said rocking levers extending for a portion of their length on the same side of the operating shaft, tappets on said connecting rods and cams on said operating shaft arranged to alternately engage the tappets of the oppositely arranged stampers, whereby a continuous revolution of the operating shaft will alternately reciprocate said stampers, substantially as described.

8. A machine for stamping peat turf, comprising a rotatable carrier, means for rotating same, a driving shaft extending entirely across the machine, a plurality of driving wheels thereon, a train of wheels driven by each of said driving wheels, radial operating shafts attached to each of said driven wheels, stampers located upon each side of said operating shafts and said driving shaft, and in operative position with relation to said carrier, connections between said stampers and said shafts whereby the revolution of each shaft will cause the alternate reciprocation of the oppositely disposed stampers, substantially as described.

9. A machine for stamping peat turf, comprising a rotatable carrier having external gear teeth, a driving shaft extending entirely across the machine, a plurality of driving wheels thereon, a plurality of wheels driven by each of said driving wheels, radial shafts attached to each of said driven wheels, gears and shafting operated by one of said shafts to rotate said carrier, stampers located on each side of said driving shaft and on the balance of said radial shafts, connections between each of said shafts and the stampers located on opposite sides thereof, whereby a continuous rotation of each of said shafts will alternately reciprocate said oppositely disposed stampers, substantially as described.

10. A machine for stamping peat turf, comprising a movable carrier, means for moving same, a stamper arranged in operative relation to said carrier, adjustable auxiliary weights on said stamper, and means for operating the stamper, substantially as described.

11. A machine for stamping peat turf, comprising a movable carrier, means for moving same, a stamper arranged in operative relation to said carrier, adjustable auxiliary weights for said stamper, rocking levers pivotally attached to said stamper, supports for said levers, a connecting rod pivotally attached to said levers, a tappet on said rod, an operating shaft, a cam thereon and connections for rotating said shaft, substantially as described.

12. A machine for stamping peat turf, comprising a movable carrier, means for moving same, a pair of stampers arranged in operative relation to said carrier, adjustable auxiliary weights on said stampers, a single operating shaft between said stampers, rocking levers pivotally attached to each of said stampers, supports for said levers, rods pivotally attached to each of said levers, both said rods having a portion on the same side of the operating shaft, means for holding said rods in operative position, tappets on said rods, an operating shaft and lugs therein, adapted by the means described to cause alternating reciprocations of the stampers, substantially as described.

13. In a machine for stamping peat turf, a flat bed-plate, a stamper provided with a non-rotatable bearing face convex in cross-section and straight in longitudinal section, and means for causing a relative traveling movement between said stamper and bed-plate.

14. In a machine for stamping peat turf, a flat bed-plate of rigid material and a stamper provided with a non-rotatable wooden bearing face convex in cross-section and straight in longitudinal section, and means for causing a relative traveling movement between said stamper and bed-plate.

In testimony whereof, I have hereunto set my hand in the presence of two subscribing witnesses.

OSCAR PETER BECK.

Witnesses:
   ADOLPH F. DINSE,
   JOHN ROBINSON.